US012635052B2

(12) United States Patent
Bostick

(10) Patent No.: US 12,635,052 B2
(45) Date of Patent: May 19, 2026

(54) AERIAL VEHICLE ELECTRICAL POWER SYSTEM AND METHODS OF SUPPLYING REGULATED VOLTAGE AND REGULATING POWER VARIANCES IN A TETHERED AERIAL VEHICLE

(71) Applicant: PEGAPOD LLC, Chantilly, VA (US)

(72) Inventor: Randall Bostick, Aldie, VA (US)

(73) Assignee: PEGAPOD LLC, Chantilly, VA (US)

( * ) Notice: Subject to any disclaimer, the term of this patent is extended or adjusted under 35 U.S.C. 154(b) by 106 days.

(21) Appl. No.: 18/405,931

(22) Filed: Jan. 5, 2024

(65) Prior Publication Data

US 2024/0237170 A1 Jul. 11, 2024

Related U.S. Application Data

(60) Provisional application No. 63/450,000, filed on Mar. 4, 2023, provisional application No. 63/445,001, filed
(Continued)

(51) Int. Cl.
*H05B 45/30* (2020.01)
*B64U 10/13* (2023.01)
(Continued)

(52) U.S. Cl.
CPC ............. *H05B 45/38* (2020.01); *B64U 10/13* (2023.01); *B64U 20/80* (2023.01); *H05B 45/48* (2020.01); *B64U 2201/202* (2023.01)

(58) Field of Classification Search
CPC ........ H05B 45/30; H05B 45/38; H05B 45/48; B64U 10/13; B64U 20/80; B64U 2201/202; B64C 39/022; B64D 47/02; B64D 47/04
See application file for complete search history.

(56) References Cited

U.S. PATENT DOCUMENTS

| | | | |
|---|---|---|---|
| 7,510,142 B2 | 3/2009 | Johnson | ................. B64C 27/08 |
| 8,434,920 B2 * | 5/2013 | Jones | .................... G05D 1/0094 |
| | | | 362/85 |

(Continued)

FOREIGN PATENT DOCUMENTS

| | | | |
|---|---|---|---|
| CN | 103144779 | 6/2013 | ................ B64F 1/36 |
| CN | 105083548 | 11/2015 | ............. B64C 27/20 |

(Continued)

OTHER PUBLICATIONS

International Search Report and Written Opinion issued in WO Patent Appln. No. PCT/US21/61752, dated Feb. 3, 2022, 14 pages.
(Continued)

*Primary Examiner* — Jimmy T Vu
(74) *Attorney, Agent, or Firm* — HAYES SOLOWAY P.C.

(57) ABSTRACT

An aerial vehicle electrical power system for providing regulated voltage and regulating power variances in a tethered aerial vehicle includes a plurality of light-emitting diodes (LEDs) carried by the aerial vehicle having at least one propulsion device. At least one electrical circuit is carried by the aerial vehicle. The at least one electrical circuit has an amperage boost regulator in parallel with a speed controller of the at least one propulsion device, wherein the amperage boost regulator in parallel with the speed controller delivers regulated voltage to the speed controller. A tether is connected between the aerial vehicle and a power source positioned remote from the aerial vehicle. Electrical power is transmitted to the aerial vehicle and at least a portion of the plurality of LEDs through the tether.

15 Claims, 5 Drawing Sheets

Related U.S. Application Data on Feb. 13, 2023, provisional application No. 63/439,845, filed on Jan. 18, 2023, provisional application No. 63/437,694, filed on Jan. 7, 2023.

(51) Int. Cl.
*B64U 20/80* (2023.01)
*H05B 45/38* (2020.01)
*H05B 45/48* (2020.01)

(56) References Cited

U.S. PATENT DOCUMENTS

| | | | |
|---|---|---|---|
| 8,587,238 B2 | 11/2013 | Maiocchi | H02M 3/335 |
| 8,729,589 B2 | 5/2014 | Hussell et al. | H01L 21/00 |
| 8,934,267 B2 | 1/2015 | He et al. | H02M 3/335 |
| 9,446,858 B2 | 9/2016 | Hess | B64F 3/02 |
| 9,611,038 B2 | 4/2017 | Dahlstrom | G01C 23/00 |
| 9,800,091 B2 | 10/2017 | Nugent, Jr. et al. | B64F 3/02 |
| 9,820,343 B1 | 11/2017 | Fragiacomo et al. | H05B 33/08 |
| 9,853,455 B1 | 12/2017 | Casey et al. | H02J 1/10 |
| 9,975,632 B2 | 5/2018 | Alegria | G05D 1/00 |
| 10,011,352 B1 | 7/2018 | Dahlstrom | B64C 39/02 |
| 10,099,782 B2 | 10/2018 | Hundemer | B64C 39/02 |
| 10,669,042 B2 | 6/2020 | Molnar et al. | B64D 47/06 |
| 10,696,395 B2 | 6/2020 | Molnar et al. | B64C 39/02 |
| 10,875,648 B2 | 12/2020 | Schmalzried et al. | B64D 1/22 |
| 10,950,988 B1 | 3/2021 | Thiel et al. | H02M 3/04 |
| 11,136,215 B2 | 10/2021 | Benson | B65H 75/36 |
| 11,142,316 B2 | 10/2021 | Sikora et al. | B64C 39/02 |
| 11,235,890 B1 | 2/2022 | Dahlstrom et al. | B64D 47/08 |
| 11,420,771 B2 | 8/2022 | Bostick | B64F 3/02 |
| 2007/0040696 A1 | 2/2007 | Mubaslat et al. | G08B 21/00 |
| 2012/0044710 A1 | 2/2012 | Jones | B64C 39/02 |
| 2013/0170850 A1 | 7/2013 | Maruyama et al. | H02M 3/33507 |
| 2013/0233964 A1 | 9/2013 | Woodworth et al. | B64C 37/02 |
| 2014/0183300 A1 | 7/2014 | Macculloch et al. | B64C 39/02 |
| 2014/0236388 A1 | 8/2014 | Wong et al. | B64C 27/08 |
| 2015/0041598 A1 | 2/2015 | Nugent et al. | B64D 27/02 |
| 2016/0185456 A1 | 6/2016 | Ducharme et al. | B64C 39/02 |
| 2016/0313744 A1 | 10/2016 | Amelio et al. | G05D 1/10 |
| 2016/0318607 A1 | 11/2016 | Desai et al. | B64D 1/16 |
| 2017/0308104 A1 | 10/2017 | Eberheim et al. | G05D 1/10 |
| 2017/0346387 A1 | 11/2017 | Davis et al. | H02M 1/32 |
| 2018/0118374 A1 | 5/2018 | Lombardini et al. | B64F 3/02 |
| 2018/0150073 A1* | 5/2018 | Lee | B64U 10/13 |
| 2018/0205242 A1 | 7/2018 | Kelly-Morgan et al. | H02J 7/00 |
| 2018/0287833 A1 | 10/2018 | Kennedy | H04L 25/26 |
| 2019/0047704 A1 | 2/2019 | Liu | B64C 39/02 |
| 2019/0112048 A1 | 4/2019 | Culver | B64C 39/02 |
| 2019/0283869 A1 | 9/2019 | Broberg et al. | B64C 39/02 |
| 2020/0153340 A1 | 5/2020 | Traube | H02M 3/158 |
| 2020/0160733 A1* | 5/2020 | Dick | G06V 20/176 |
| 2020/0211737 A1 | 7/2020 | Parr | H01B 9/00 |
| 2020/0231279 A1 | 7/2020 | Buyse et al. | B64C 39/02 |
| 2020/0310466 A1 | 10/2020 | Fischer | G05D 1/10 |
| 2020/0369408 A1 | 11/2020 | Dolata et al. | B64F 3/02 |
| 2021/0269149 A1 | 9/2021 | Culver | B64C 39/02 |
| 2021/0341128 A1 | 11/2021 | Abron | F21S 43/14 |
| 2021/0362856 A1 | 11/2021 | Hashiguchi et al. | B64C 39/02 |
| 2021/0366282 A1 | 11/2021 | Hashiguchi et al. | G08G 1/127 |
| 2022/0024577 A1 | 1/2022 | Stamatovski | B64C 39/02 |
| 2022/0177159 A1* | 6/2022 | Bostick | B64U 10/60 |
| 2022/0255316 A1 | 8/2022 | Perkinson et al. | H02J 1/12 |

FOREIGN PATENT DOCUMENTS

| | | | |
|---|---|---|---|
| CN | 105217044 A * | 1/2016 | |
| CN | 104081112 | 3/2016 | F21S 2/00 |
| CN | 206432912 | 8/2017 | H02M 7/217 |
| CN | 105217044 | 3/2019 | B64D 27/24 |
| DE | 102017216681 | 3/2019 | B64C 39/02 |
| JP | 2013137474 | 7/2013 | G03G 21/00 |
| JP | 2015220175 | 12/2015 | H05B 37/02 |
| JP | 2016210229 | 12/2016 | B64C 39/02 |
| JP | 2019144735 | 8/2019 | G05F 1/56 |
| KR | 1020160085179 | 7/2016 | F21V 7/10 |
| KR | 102181081 | 11/2020 | |
| KR | 102472923 | 11/2022 | B60L 58/30 |
| WO | WO2007022409 | 2/2007 | G01R 31/26 |
| WO | WO2013021516 | 2/2013 | H05B 37/00 |
| WO | WO2019175134 | 9/2019 | H02M 3/156 |

OTHER PUBLICATIONS

Notice of Allowance issued in Chinese Appln. No. 202180082251.7, with machine translation, dated Jan. 2, 2024, 12 pages.
Notice of Allowance issued in Korean Appln. No. 1020237019356, with machine translation, dated Jan. 24, 2024, 7 pages.
Search Report issued in EP Appln. No. 21901506.2, dated Feb. 7, 2024, 7 pages.
Office Action issued in Japanese Application No. 2023-558301, dated Jul. 25, 2024, with English machine translation, 4 pgs.
International Search Report and Written Opinion issued in WO Patent Appln. No. PCT/US2024/010552, dated Mar. 25, 2024, 12 pgs.

* cited by examiner

100

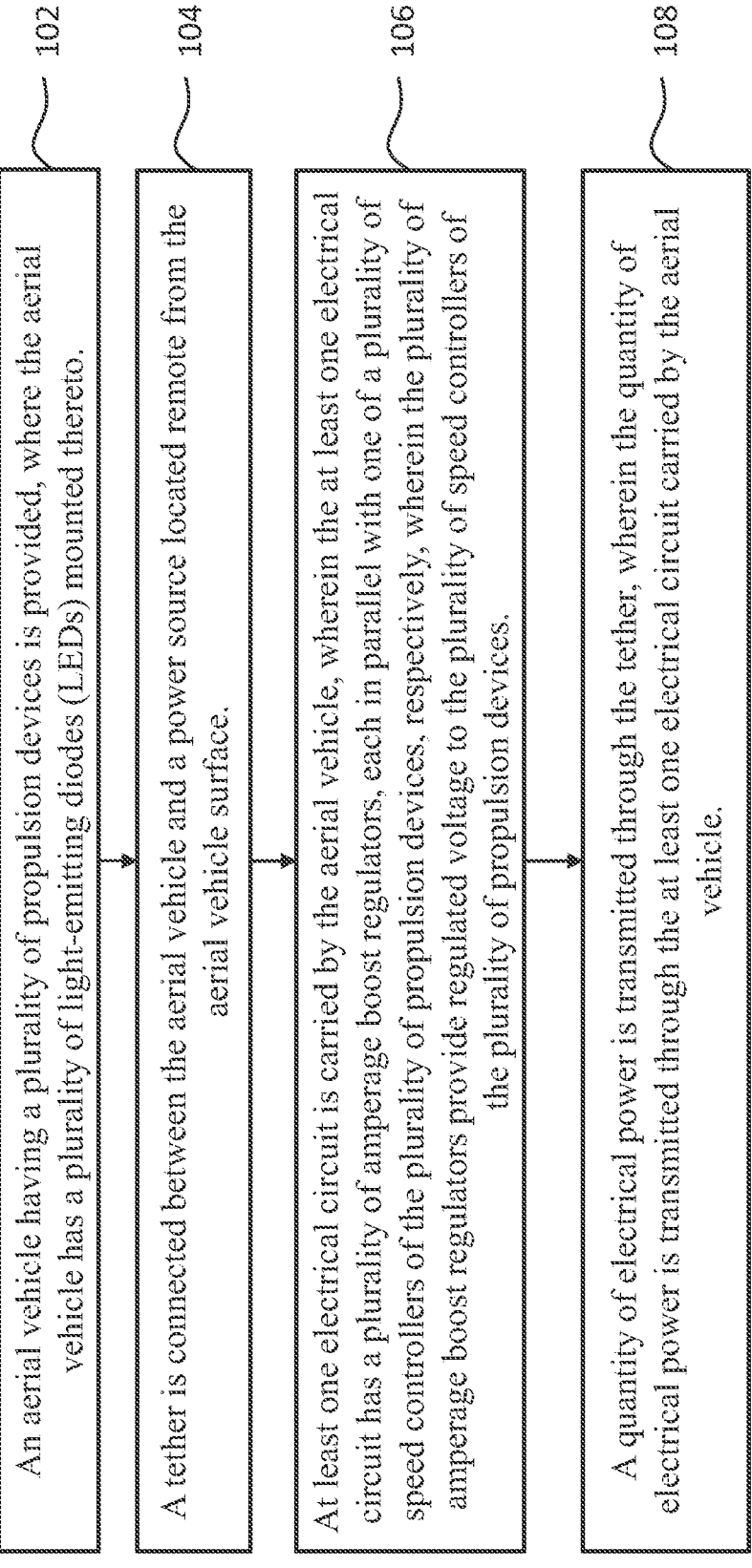

An aerial vehicle having a plurality of propulsion devices is provided, where the aerial vehicle has a plurality of light-emitting diodes (LEDs) mounted thereto.

102

A tether is connected between the aerial vehicle and a power source located remote from the aerial vehicle surface.

104

At least one electrical circuit is carried by the aerial vehicle, wherein the at least one electrical circuit has a plurality of amperage boost regulators, each in parallel with one of a plurality of speed controllers of the plurality of propulsion devices, respectively, wherein the plurality of amperage boost regulators provide regulated voltage to the plurality of speed controllers of the plurality of propulsion devices.

106

A quantity of electrical power is transmitted through the tether, wherein the quantity of electrical power is transmitted through the at least one electrical circuit carried by the aerial vehicle.

AERIAL VEHICLE ELECTRICAL POWER SYSTEM AND METHODS OF SUPPLYING REGULATED VOLTAGE AND REGULATING POWER VARIANCES IN A TETHERED AERIAL VEHICLE

CROSS REFERENCE TO RELATED APPLICATION

This application claims benefit of U.S. Provisional Application Ser. No. 63/437,694 entitled, "System to power both a UAS and Lighting" filed Jan. 7, 2023, U.S. Provisional Application Ser. No. 63/439,845 entitled, "A system to power both a UAS and Lighting without a DC Down Converter" filed Jan. 18, 2023, U.S. Provisional Application Ser. No. 63/445,001 entitled, "System and method to power a tethered drone without a step-down voltage converter" filed Feb. 13, 2023, and U.S. Provisional Application Ser. No. 63/450,000 entitled, "System and method to power a tethered drone without a step-down voltage converter" filed Mar. 4, 2023, the entire disclosures of which are incorporated herein by reference.

FIELD OF THE DISCLOSURE

The present disclosure is generally related to electrical power systems and more particularly is related to aerial vehicle electrical power systems and related methods of regulating power variances and supplying regulated voltage in a tethered aerial vehicle, and in particular, without the use of a step-down converter.

BACKGROUND OF THE DISCLOSURE

Aerial vehicular systems, and in particular, aerial vehicles, drones, unmanned aerial systems (UASs), manned aerial systems, and similar aerial vehicles, all of which are together referred to herein as aerial vehicles (AVs), are becoming increasingly prevalent. In the military, both manned aerial systems and UASs are commonly used to conduct surveillance, deliver items, and perform operations. Outside of the military, AVs or drones are widely used in recreation, sport, and various industries to perform tasks. In recent times, AVs have been outfitted with electronic devices, such as cameras, thereby allowing users to take aerial photographs.

In a similar manner, AVs have been equipped with lights to provide aerial or elevated overhead lighting of an outdoor space. These AVs with lights can be used to provide fast and temporary lighting for an outside space, in place of more traditional outdoor lighting units, such as permanent light poles or trailer-mounted lighting units which have temporary lights that are raised to an elevated position. High power wide area lighting from these AVs, typically greater than 10,000 lumens delivered from higher than 25 feet, enables many activities to occur outdoors at night which would not otherwise be possible, including, for example, construction, sports, and entertainment. Additionally, with the advancement of both AV and lighting technology, it is now possible for an AV to lift high-powered lighting devices to altitudes at and above that of conventional light poles. Currently, due to the power limitations of the onboard battery of the AV, most implementations of high power lighting on non-tethered AVs emit less than 12,000 lumens and are limited to less than an hour of lighted flight, which restricts the practical use of such a system.

To provide temporary outdoor lighting for longer periods of time, or to provide brighter lighting, an AV may be equipped with a tether which electrically connects the AV with a ground-based power supply, such as a battery, generator, or a traditional hardwired power from the grid. Using a tethered AV, it is now possible to provide continuous power to the AV for high powered lighting greater than 10,000 lumens for indefinite or near-indefinite periods of time. The tether typically includes a wire having conductors which may be enveloped within a sheathing or light-weight rope. Electrical power may be delivered from the ground-based power supply, through the tether, and to both the AV's propulsion or flight control systems and the lighting system carried by the AV. However, it can often be difficult to deliver the electrical power to both the AV and high powered LEDs through the tether in a weight efficient manner. Lowering the payload weight would enable smaller, lighter, more portable, and less power hungry AVs to be used for lighting.

Current tethered AVs are designed to power several different payloads. Typically, higher voltage DC delivered through the tether from the ground-based power source is down converted by an onboard DC converter or downconverter to a lower voltage for use by the drone and accessories, including high power lighting. If more power for the light accessory is required, then a larger, and heavier, DC converter and heat sink will also be required. Thus, to carry the extra weight, the AV size must increase as the power requirement for lighting increases. As the overall weight increases, the required power from the ground-based power system also increases. Even in AVs which minimize the size and weight of the onboard DC converter, there still remains the need to provide an AV which weighs less.

Additionally, conventional AVs also can be subject to complications in manufacturing bottlenecks where it is difficult or impossible to obtain the parts needed for AV operation. For instance, there is often difficulty in obtaining DC converters which meet the spatial and weight constraints of AVs due to a lack of supply in the market. When a part is not readily available, it can be that the manufacturer of an AV must manufacture the part themselves, which can be inefficient and costly.

Thus, a heretofore unaddressed need exists in the industry to address the aforementioned deficiencies and inadequacies.

SUMMARY OF THE DISCLOSURE

Embodiments of the present disclosure provide an aerial vehicle electrical power system. Briefly described, in architecture, one embodiment of the system, among others, can be implemented as follows. An aerial vehicle has at least one propulsion device. A plurality of light-emitting diodes (LEDs) is carried by the aerial vehicle. At least one electrical circuit is carried by the aerial vehicle, wherein the at least one electrical circuit has an amperage boost regulator in parallel with the at least one propulsion device or a speed controller of the at least one propulsion device, wherein the amperage boost regulator in parallel with the at least one propulsion device or the speed controller of the at least one propulsion device provides regulated voltage to the at least one propulsion device or the speed controller. A tether is connected between the aerial vehicle and a power source positioned remote from the aerial vehicle, wherein electrical power is transmitted to the aerial vehicle and at least a portion of the plurality of LEDs through the tether.

The present disclosure can also be viewed as providing an aerial vehicle electrical power system. Briefly described, in architecture, one embodiment of the system, among others, can be implemented as follows. An aerial vehicle has a plurality of propulsion devices. A plurality of light-emitting diodes (LEDs) is carried by the aerial vehicle. At least one electrical circuit is carried by the aerial vehicle, wherein the at least one electrical circuit has a plurality of amperage boost regulators, each in parallel with one of a plurality of speed controllers of the plurality of propulsion devices, respectively, wherein the amperage boost regulators in parallel with the plurality of speed controllers provides regulated voltage to the plurality of speed controllers. A tether is connected between the aerial vehicle and a power source positioned remote from the aerial vehicle, wherein electrical power is transmitted to the aerial vehicle and at least a portion of the plurality of LEDs through the tether.

The present disclosure can also be viewed as providing methods of regulating power variances and providing regulated voltage in a tethered aerial vehicle. In this regard, one embodiment of such a method, among others, can be broadly summarized by the following steps: providing an aerial vehicle having a plurality of propulsion devices, and having a plurality of light-emitting diodes (LEDs) mounted thereto; connecting a tether between the aerial vehicle and a power source located remote from the aerial vehicle surface; providing at least one electrical circuit carried by the aerial vehicle, wherein the at least one electrical circuit has a plurality of amperage boost regulators, each in parallel with one of a plurality of speed controllers of the plurality of propulsion devices, respectively, wherein the plurality of amperage boost regulators provide regulated voltage to the plurality of speed controllers of the plurality of propulsion devices; and transmitting a quantity of electrical power through the tether, wherein the quantity of electrical power is transmitted through the at least one electrical circuit carried by the aerial vehicle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a flowchart illustrating a method for regulating power variances and providing regulated voltage in a tethered aerial vehicle, in accordance with exemplary embodiments of the present disclosure.

DETAILED DESCRIPTION

Most conventional implementations of tethered aerial vehicle lighting require a relatively heavy and space consuming DC downconverter which is located on the AV, e.g. carried onboard the AV during flight. The DC converter, also known as a DC downconverter or downconverter, converts the high voltage power received through the tether to a lower voltage which is usable by the LEDs carried by the AV and by the propulsion system of the AV, e.g., the rotors or similar propulsion devices. However, because the DC converter adds weight and bulk to the AV, it limits the efficiency at which the AV can provide the desired lighting effects.

The present disclosure improves over these shortcomings of conventional devices by eliminating the DC converter. Elimination of the DC converter reduces the weight and the spatial payload of the AV, which ultimately allows for the manufacture and use of an AV which is lighter, quieter, and uses less power. The resulting AV uses a tether which enables power to be delivered to the AV while in flight for high power lighting greater than 10,000 lumens and for extended periods of time, e.g., where the operational time is only limited by the operational limits of the mechanical flight components.

Figure 1:
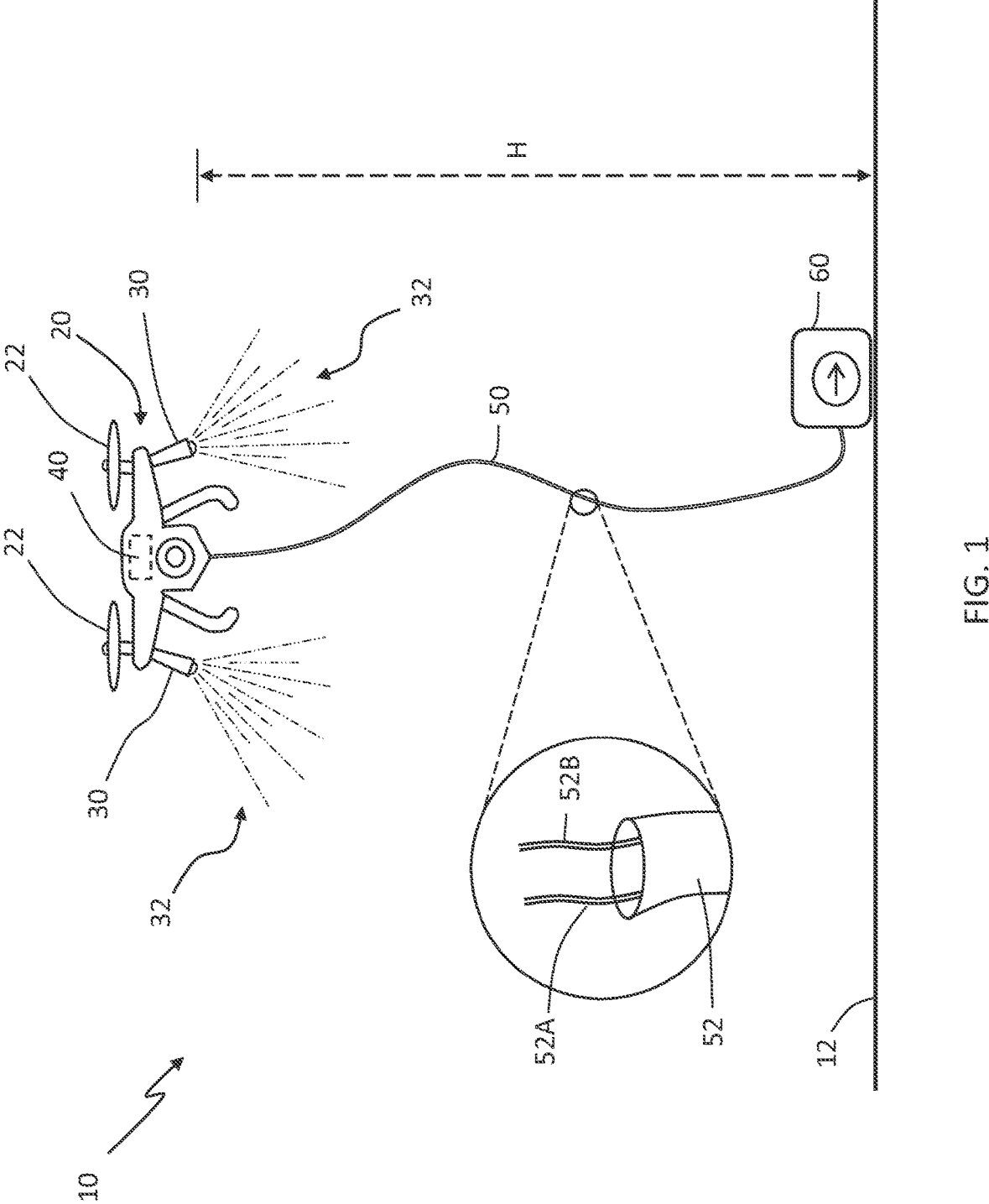
FIG. 1 is a diagrammatical illustration of a tethered aerial vehicle using an aerial vehicle electrical power system, in accordance with exemplary embodiments of the present disclosure.

FIG. 1 is a diagrammatical illustration of a tethered AV using an aerial vehicle electrical power system 10, in accordance with exemplary embodiments of the present disclosure. As shown, the aerial vehicle electrical power system 10, which may be referred to herein simply as 'system 10' includes an aerial vehicle 20, which may include any type of aerial vehicle, such as manned vehicle, an unmanned aerial system (UAS), a drone, or a similar vehicle which is capable of aerial flight. The AV 20 includes one or more propulsion devices 22. The propulsion devices 22 may be, for example, rotors, propellers, fans, motors, or similar devices which are capable of providing propulsion to the AV 20. Any number of propulsion devices 22 may be used, as may be determined based on the design of the AV 20. A plurality of light-emitting diodes (LEDs) 30 are carried by the aerial vehicle 20, such as by mounting one or more LED arrays or similar lighting fixtures to the frame of the AV 20. The LEDs 30 are capable of emitting a quantity of light 32 upon a surface of the ground 12, or another location, to provide illumination. In one example, the LEDs are high-powered LEDs capable of emitting substantially 20,000 lumens or greater.

At least one electrical circuit 40 is carried by the AV 20, and often, the electrical circuit 40 may be integrated with the electrical system of the AV 20 itself, such that it is in communication with other systems of the AV 20, such as propulsion systems, control systems, or other systems of the AV 20. As described relative to FIG. 2, the electrical circuit 40 may be used to regulate electrical power variance within the AV 20 and the regulated voltage to the parallel load, such as the speed controller 44. This can be used to improve performance of the AV 20 and allows for the omission of a DC converter which is typically required in tethered AV operations. A tether 50 is connected between the AV 20 and a power source 60 which is positioned on the ground surface 12 or similar location remote from the AV 20 in this example, such that the AV 20 is positioned a height H above the ground surface 12. Within the scope of this disclosure, the power source 60 may be located on the Earth's surface, on a land or water based vehicle, on a different UAS, or in any other location which is remote from the AV 20. Electrical power for powering the LEDs 30 and the AV 20 is transmitted to the AV 20 and at least a portion of the plurality of LEDs 30 through the tether 50.

Figure 2:
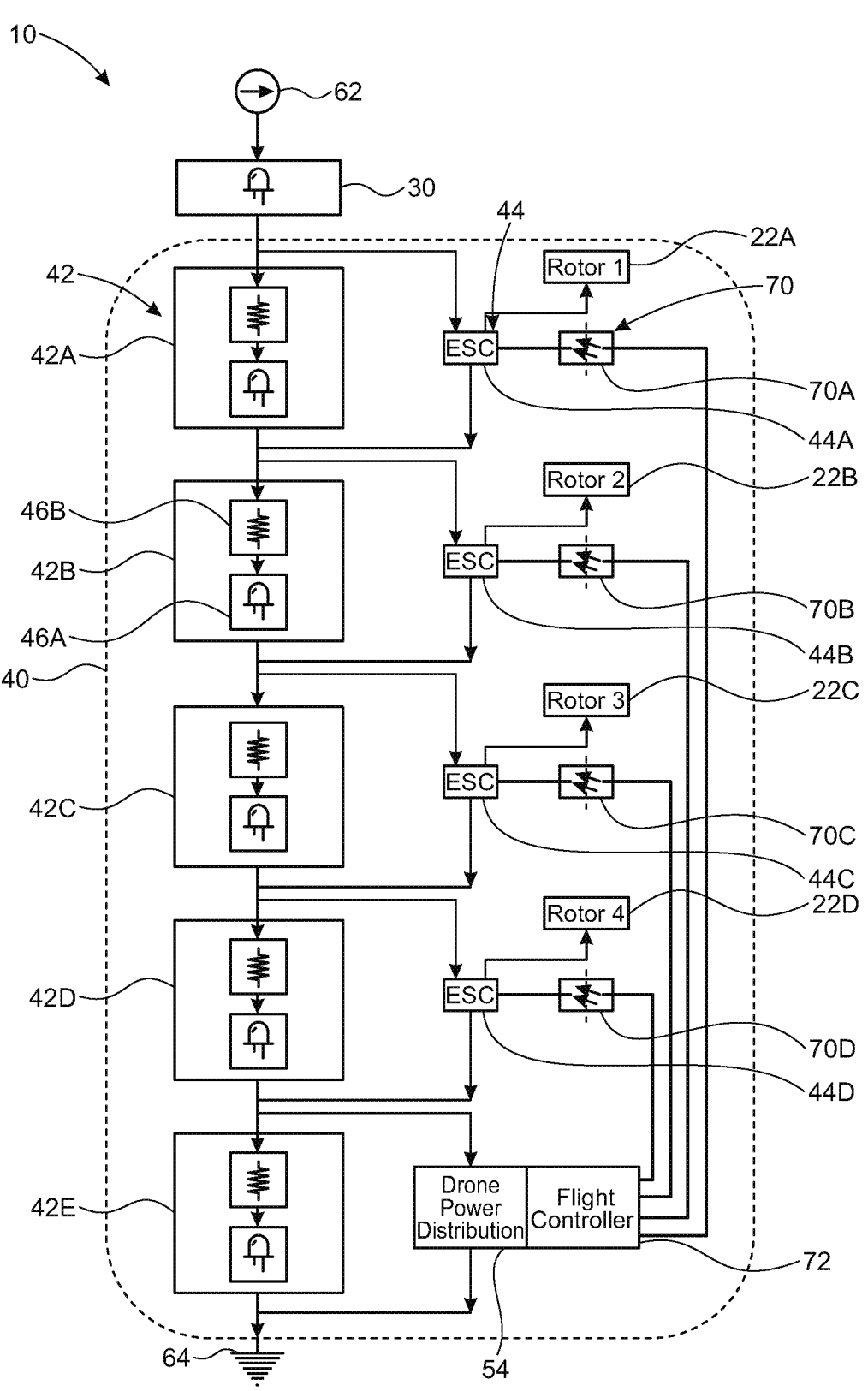
FIG. 2 is a schematic diagram showing one example of the aerial vehicle electrical power system, in accordance with exemplary embodiments of the present disclosure.

FIG. 2 is a schematic diagram showing one example of the aerial vehicle electrical power system 10, in accordance with exemplary embodiments of the present disclosure. Relative to FIGS. 1-2, power is supplied to the AV 20 and the LEDs 30 using the tether 50 which is formed from a two-conductor wire 52, having a positive conductor 52A and a negative (or ground) conductor 52B, which are connected to the positive terminal 62 of the power source 60 and the negative terminal 64 of the power source 60. While the power source 60 may vary, in one example, it is a DC power source and a boost converter which maintains a constant voltage. Although a four or three-conductor wire used in the tether 50 could feasibly be a power solution for the AV 20 and LEDs 30, and may be simpler to implement, the added weight from the additional wires, as compared to a two-conductor wire tether 50, would require more power to the AV 20, and likely an AV 20 with a greater lift capacity. The use of a two-conductor wire enables the minimum possible tether weight to be achieved, which in turn, lowers the overall weight of the AV 20, thereby reducing the power required by the AV 20. In some instances, this means that potentially, a smaller and less expensive AV 20 may be used. Thus, the use of the two-conductor wire as the tether 50, or as a component of the tether 50, ensures the tether 50 is light enough to not add unneeded weight to the payload of the AV 20.

As shown in FIG. 2, the electrical circuit 40 carried by the AV 20 has one or more amperage boost regulators 42 in parallel with speed controller 44, where the amperage boost regulator 42 regulates voltage to the speed controller 44 regulates power variances across the tether 50. FIG. 2 depicts four amperage boost regulators 42A-42D, each of which is in parallel with a speed controller 44A-44D. The speed controllers 44A-44D are in electrical communication with the propulsion device 22, such as the motors of the propulsion devices 22A-22D, and they include an electronic circuit that controls and regulates the speed of an electric motor which operates the propulsion devices 22A-22D. For instance, the speed controller may be a device or system of devices which control and/or send power to a motor or a propulsion device 22, thereby controlling operation of the propulsion device 22. In one example, the speed controller 44 may be an electronic speed controller (ESC), or in a different example where a brushed motor is used, the speed controller may be a device providing pulse width modulation (PWM) which controls a throttling of the motor. Accordingly, any type of speed controller 44 may be used, including stand alone devices or devices or operations included in other components.

While the electrical circuit 40 can have any number of amperage boost regulators 42A-42D corresponding to any number of speed controllers 44A-44D, which themselves correspond to any number of propulsion devices 22A-22D, FIG. 2 illustrates an example with four of each unit which corresponds to a typical architecture of a quadcopter, e.g., an AV 20 which has four motors which correspond to four propulsion devices 22A-22D or rotors. With an AV 20 which has more or less propulsion devices 22, the electrical circuit 40 may have more or less amperage boost regulators 42A-42D.

The amperage boost regulator 42 may be characterized as a resistance device, such as a diode, which increases in resistance as voltage across amperage boost regulator 42 decreases. The amperage boost regulator 42 may be used in parallel with a load which has a high variance of amperage requirements, such as the speed controller 44. The amperage boost regulator 42 acts by decreasing amperage and voltage variances across the tether or in series circuit, e.g., the tether or branch of the tether which is in series with the amperage boost regulator 42, which may be caused by amperage variances from propulsion device 22 and resistance between the electrical power source 60 and the tether or in series circuit. The parallel amperage boost regulator 42 to the speed controller 44 pulls greater amperage which, due to planned resistance in the system 10 including the tether 50, limits voltage increases and allows the voltage provided to the propulsion device 22 from the speed controller 44 to remain below a specified maximum, or to remain relatively consistent. For instance, when the speed controller 44 draws greater amperage, the amperage boost regulator 42 draws less amperage thereby decreasing amperage variances across the tether 50, and when the speed controller 44 draws less amperage, the amperage boost regulator 42 draws greater amperage thereby decreasing amperage variances across the tether 50. The point at which the parallel amperage boost regulator 44 pulls greater amperage can vary depending on the design of the system 10.

Figure 3:
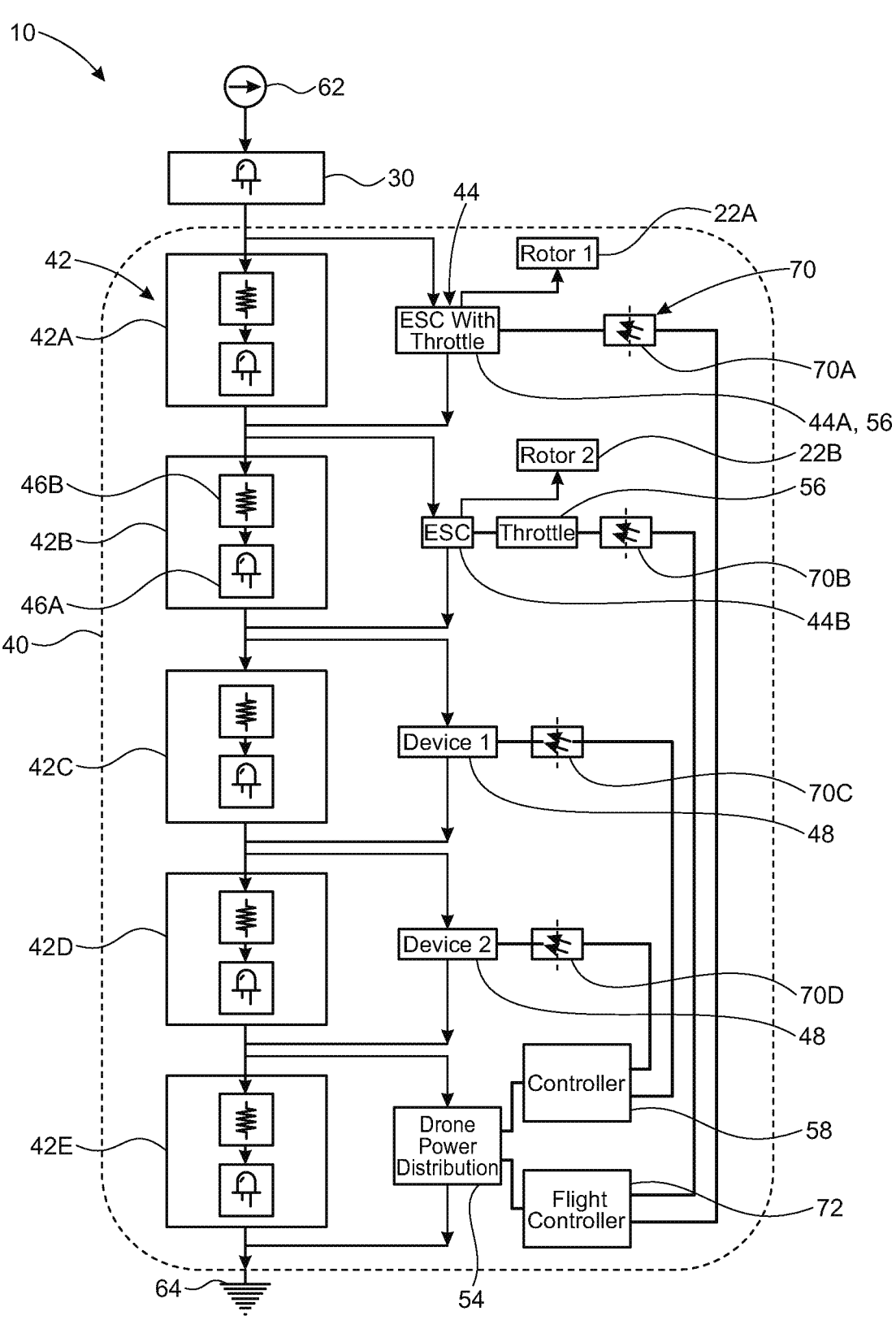
FIG. 3 is a schematic diagram showing one example of the aerial vehicle electrical power system, in accordance with exemplary embodiments of the present disclosure.

The amperage boost regulator 42 may include at least one or more LEDs 46A and/or a resistance device 46B. The LEDs 46A are wired in series and are physically attached to the AV 20. The term "LED" may refer to a single LED, LEDs in parallel, LEDs in series, or both. It is also noted that LEDs are used herein, but the system 10 may also function with diodes which do not emit light. In one example, each LED 46A is paired with a resistance device 46B, where the combination of the two form an LED stage of the amperage boost regulator 42. In this example, the resistance device 46B in each stage is optional and may only be required to minimize LED flicker or to increase stage voltage. The wattage of each LED stage may exceed the power requirements of each parallel load, e.g., a speed controller 44, a power distribution system 54, or a payload device 48 (FIG. 3).

In the example of FIG. 2, the LEDs 46A may be used together with the LEDs 30, or separately from LEDs 30. For instance, in one example, the LEDs 30 may be LEDs which are used primarily for lighting purposes to achieve ground illumination, whereas the LEDs 46A may be used for amperage regulation, but it may be possible to use the LEDs 46A for lighting purposes too, either in conjunction with LEDs 30 or in some situations, in place of LEDs 30, such LEDs 46A are used as the main source for both amperage regulation and lighting purposes, while LEDs 30 supplement illumination. As shown, the LEDs 46A and the resistance device 46B are in parallel with the speed controller 44. Each of the amperage boost regulators 42A-42D is in series with one or more additional amperage boost regulator 42A-42D, as shown, and each amperage boost regulator 42A-42D is typically in parallel to a speed controller 44A-44D, or another load, as described relative to FIG. 3.

The electrical circuit 40 may also include an electrical isolator 70, such an optocoupler, optoisolator, a capacitive isolation device, or another type of electrical isolation device, connected between the speed controller 44 and a flight controller 72 which electrically isolates the speed controller 44 from the flight controller 72. The flight controller 72 is connected to a power distribution module 54 which is in parallel with one of the amperage boost regulators 42E. As shown in FIG. 2, each speed controller 44A-44D receives a control signal from the flight controller 72 through the electrical isolator 70. The flight controller 72 receives power from power distribution module 54.

The speed controllers 44A-44D and the power distribution module 54 may each separately receive regulated voltage from each depicted parallel amperage boost regulator 42A-42E, with the amperage boost regulators 42A-42E being in series with one another. The positive wire of the tether is connected to the positive connection 62 of the power source 60 at one side of the electrical circuit 40 and another side has a ground wire which is connected to the negative terminal 64 of the power source 60.

In operation, the flight controller 72 may transmit a control signal to the electrical isolator 70, which in turn, transmits that signal to the speed controller 44 without transmitting electrical power, such that the speed controllers 44A-44D can receive the control signal which originates from the flight controller 72 but do not receive electrical power. Since each speed controller 44A-44D is connected to a motor of a propulsion device 22A-22D, the speed controller 44A-44D may control the speed via electrical power to the propulsion device 22A-22D based on the control signal received from the electrical isolator 70 and using the electrical power supplied through the amperage boost regulator 42. This electrical isolation of the speed controllers 44A-44D from the power distribution module 54 yet connection to the flight controller 72 to receive the control signal may allow each motor of the propulsion device 22 to be powered by the corresponding amperage boost regulator 42. This, in turn, eliminates the need to have a DC converter which is typically used in conventional tethered drones, and where a speed controller which is typically connected to a battery through the power distribution module, which distributes both power and control signals to the speed controllers.

In the system 10, the amperage boost regulators 42A-42E, and in particular the LEDs 46A or resistance devices 46B of the amperage boost regulators 42A-42E, act as voltage dividers or voltage references and provide a regulated voltage to loads placed in parallel. The LEDs 46A of the amperage boost regulators 42A-42E are arranged in series with one another. Each LED 46A of the amperage boost regulators 42A-42E provides regulated power to the parallel load, such as the speed controllers 44A-44D for amperage boost regulators 42A-42D, and the power distribution module 54 for amperage boost regulator 42E.

Each speed controller 44A-44D receives an electrically isolated signal from the flight controller 72, where the electrical isolation of the flight control signal to the speed controllers 44A-44D is achieved by positioning the electrical isolator 70A-70D between the flight controller 72 and each speed controller 44A-44D. In this arrangement, the speed controllers 44A-44D are connected to the receiving side of the electrical isolator 70A-70D, where that receiving side of the electrical isolator 70A-70D is powered by the speed controllers 44A-44D 5 volt output (BEC) or another source which is electrically isolated from the flight controller 72.

In an alternative example, it is noted that only one LED 46A and optional resistance device 46B of the amperage boost regulator 42 may be used to power the entire AV 20, including all speed controllers 44 and power distribution modules 54. When this occurs, and only one LED stage is used to power a speed controller 44 and the power distribution module 54, then electrical isolation may not be required. It is also noted that while all speed controllers 44 and the power distribution module 54 are described herein as receiving power from the tether 50, it may be possible for some or all speed controllers 44 or the power distribution module 54 to receive power from another power source, such as an on-board battery.

While there are many benefits of the system 10, one benefit is the ability to operate an aerial vehicle-mounted light system for extended or indefinite periods of time and with lighting capacity which meets or exceeds the required uses. Additionally, the system 10 minimizes the probability that the operation of the AV 20 and the LEDs 30 is interrupted by power variances through the tether 50 and to the AV 20. For instance, during certain aspects of flight of the AV 20, such as upon initial start-up and takeoff, the AV 20 can draw substantially more power than during constant flight. Similarly, certain maneuvers of the AV 20 will cause it to draw more power than when it is stationary. Since the LEDs 30 and the AV 20 are powered by the same power source 60 through the tether 50, these power draws from the AV 20 can result in flickering or similar undesirable issues with the LEDs 30. The system 10 can regulate these power variances through the tether 50 and from the AV 20 to minimize the variance of light output from the LEDs 30.

For tethered-drone systems designed to provide lighting, the system 10 reduces the weight of the AV 20 by removing the need for it to carry a DC converter or voltage down converter for conversion of higher voltage, received through the tether 50, to lower voltage DC as required by the AV 20 and optional payloads. The use of the amperage boost regulators 42A-42E in the described configuration eliminates the need for a DC converter, and allows for a significant savings in weight of the AV 20. Eliminating the DC converter saves significant weight and therefore reduces thrust and energy requirements and reduces sound output. Additionally, elimination of the DC converter means that the cost of manufacture of the AV 20 is less than conventional devices, since the same benefit of the DC converter can be achieved using amperage boost regulators 42A-42E which are less costly to obtain or build.

FIG. 3 is a schematic diagram showing one example of the aerial vehicle electrical power system 10, in accordance with exemplary embodiments of the present disclosure. In particular, FIG. 3 depicts a similar example of the electrical circuit 40 of FIG. 2 with optional aspects shown. Components and features of FIG. 2 which are included in FIG. 3 are the same as described relative to FIG. 2, unless otherwise noted.

It is noted that motor power variances may cause undesirable voltage variances at the corresponding LEDs 46A of the amperage boost regulators 42A-42E. To improve motor power output stability, the control signal from the flight controller 72 may be throttled to compensate for a voltage variance across the one or more of the speed controllers 44A-44B. This may be achieved with a device such as a signal throttle 56 which is either connected between each of the speed controllers 44A-44D and the power distribution module 54, or integrated within the speed controllers 44A-44B. For instance, in the speed controller 44A corresponding to amperage boost regulator 42A, the signal throttle 56 is integrated in the speed controller 44A, whereas in the ESD 44B corresponding to amperage boost regulator 42B, the signal throttle 56 is a separate device which is positioned between the speed controller 44B and the power distribution module 54.

Throttle signal input from the controller 72 to each speed controller 44A-44B may be adjusted to compensate for voltage variances across the speed controller 44A-44B. For example, if the baseline LED stage voltage is 12 volts and the voltage across the speed controller 44A-44B from the LED 46A of the amperage boost regulator 42A-42B decreases to 10.8 volts (10% below the baseline), then the signal to the speed controller 44A-44B would increase throttle signal by 1/(1−0.1) or 11%. The effect is that a throttle signal from the controller 72 should result in a more consistent wattage to the motor of the propulsion device 22 when the LED 46A of the amperage boost regulator 42A-42B voltage varies. The signal throttle 56 may receive the throttle signal from the controller 72, receive a voltage reading from the LED 46A of the amperage boost regulator 42A-42B, calculate the adjustment required, and send the adjusted throttle signal to the speed controller 44A-44B.

FIG. 3 also depicts the option of using an amperage boost regulator 44 to provide voltage regulated power to a payload device 48 which is not part of the propulsion system. For instance, for an AV 20 which carries a camera, sensor, or other device, the payload device 48 may be positioned in parallel with the amperage boost regulator 42C-42D, as shown. When a payload device 48 is used, it may receive a control signal from a controller 58 which is separate from the flight controller 72, as shown, or which is integrated in the flight controller 72. Any type of payload device 48 or attachment with an electrical load may be included.

Relative to FIGS. 2-3, it is noted that the system 10 may require calculations to determine the voltage required from the tether source power or base station. For instance, the base station voltage provided to the tether 50 is calculated to maintain balance such that voltage to each LED stage of the amperage boost regulator 42 is maintained within the required range. This can be summarized with the following equation:

$$V_{Base\ Power\ Supply} = VDrop_{Tether} + V_{Total\ LED\ Stages} + V_{Supplemental\ LED}$$

where $V_{Base\ Power\ Supply}$ is the based voltage from the power supply, $V\ Drop_{Tether}$ is the voltage drop across the tether 50, $V_{Total\ LED\ Stages}$ is the voltage across the total LED stages of the amperage boost regulator 42, and $V_{Supplemental\ LED}$ is the voltage of any supplemental LEDs. Voltage ranges based on expected amperage variances may be considered in the calculations. This calculation presumes that the voltage from the base station power supply will be set according to this calculation and that the supplied voltage to the tether 50 will be constant.

Additionally, various steps and considerations for balancing the system 10 may be used. In one example, the following steps are used:

1. Determine the minimum and maximum voltages and amperages for (a) optional drone power distribution, (b) speed controllers, (c) LED stages of the amperage boost regulator, and any supplemental LEDs;

2. Calculate the maximum voltage required across the tether when the system is at the maximum load;

3. Ensure the maximum amperage across the tether will not exceed the Supplemental LEDs' rating or the LEDs within each stage of the LED Power System;

4. Power the system and test to ensure that power is maintained to the drone from power off to full power and that the LEDs illuminate as expected; and 5. As needed, iterate repeatedly to update parameters and retest until the LEDs and drone operate as required through the various drone power settings and LED settings.

As an illustration of the system 10, a first working example is provided where a quadcopter drone is designed for tether power so that neither a battery nor DC converters on the drone are required. Six 12 v LEDs are wired in series and physically attached to the drone. The 1st, 2nd, 3rd, and 4th LED are each wired in parallel with one of the 4 quadcopters electronic speed controllers (ESCs). Each ESC receives a signal from an electrical isolator. Each electrical isolator receives a signal from the flight controller. The 5th LED is wired in parallel with the power distribution module. The 6th LED is added only to provide additional light. A 10 foot 2-wire tether is attached to the drone. The positive lead of the tether is connected to the positive terminal of the 1st LED. The negative lead of the tether is connected to the negative terminal of the 6th LED. A constant power supply provides 75 volts (12 v×6 LEDs+3 volts for tether resistance) and sufficient amperage to maintain power and voltage regulation to the LEDs, ESCs, and drone system power during all phases of drone flight and illumination.

In another working example, two 12 v LEDs are wired in series and physically attached to the drone. One 12 v LED is wired in parallel with the power distribution module. The power distribution module provides power to components including the flight controller and ESCs. The 2nd LED is added only to provide additional light. A 10 foot tether is attached with the positive lead connected to the positive terminal of the 1st LED. The negative lead of the tether is connected to the negative terminal of the 2nd LED. A constant power supply provides 27 volts (12 v×2 LEDs+3 volts for tether resistance) and sufficient amperage to drone power distribution during all phases of drone flight and illumination.

Figure 4:
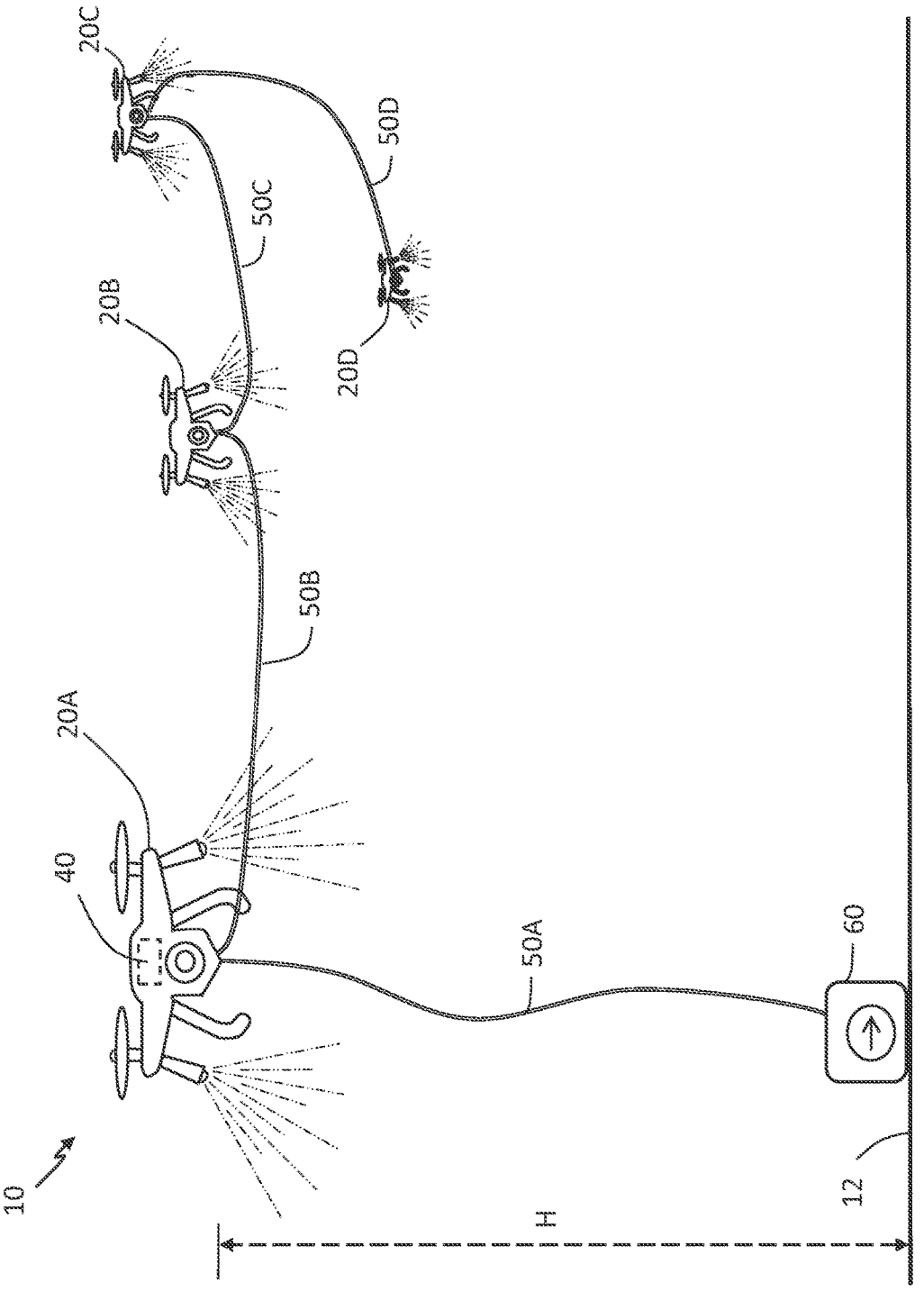
FIG. 4 is a diagrammatical illustration of a network of tethered aerial vehicles using an aerial vehicle electrical power system, in accordance with exemplary embodiments of the present disclosure.

FIG. 4 is a diagrammatical illustration of a network of tethered aerial vehicles using an aerial vehicle electrical power system 10, in accordance with exemplary embodiments of the present disclosure. As shown, using the system 10 described relative to FIGS. 1-3, it may be possible to enable AVs 20 to be connected in series and receive power from tethers connected to other AVs 20. For example, in FIG. 4, a first AV 20A is provided with a tether 50A connected to a power source 60 positioned on the ground 12, where the first AV 20A is positioned a height H above the ground 12. A second AV 20B may be positioned in an aerial location, e.g., at height H or at another height above the ground 12, where an aerial tether 50B is connected between the first and second AVs 20A, 20B. A third AV 20C may be positioned in an aerial location with an aerial tether 50C positioned between the second and third AVs 20B, 20C. A fourth AV 20D may be positioned in an aerial location with an aerial tether 50D positioned between the third and fourth AVs 20C, 20D. Any additional number of AVs and aerial tethers may also be included.

In this example, the electrical circuits 40 of each of the AVs, as described relative to FIGS. 2-3, may enable multiple AVs 20A-20D to be powered and flown together by wiring the AVs 20A-20D in series. By flying the AVs 20A-20D in series, instead of separately, the total wire weight is reduced which further increases efficiency and reduces sound output. Connecting the AVs 20A-20D in series is made possible by this system 10 due to the resulting nearly constant amperage throughout the system 10.

FIG. 5 is a flowchart illustrating a method for supplying regulated voltage to, and regulating power variances in a tethered aerial vehicle, in accordance with exemplary embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, an aerial vehicle having a plurality of propulsion devices is provided, where the aerial vehicle has a plurality of light-emitting diodes (LEDs) mounted thereto. A tether is connected between the aerial vehicle and a power source located remote from the aerial vehicle surface (block 104). At least one electrical circuit is carried by the aerial vehicle, wherein the at least one electrical circuit has a plurality of amperage boost regulators, each in parallel with one of a plurality of speed controllers of the plurality of propulsion devices, respectively, wherein the plurality of amperage boost regulators provide regulated voltage to the plurality of speed controllers of the plurality of propulsion devices (block 106). A quantity of electrical power is transmitted through the tether, wherein the quantity of electrical power is transmitted through the at least one electrical circuit carried by the aerial vehicle (block 108). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An aerial vehicle electrical power system comprising:
an aerial vehicle having at least one propulsion device;
a plurality of light-emitting diodes (LEDs) carried by the aerial vehicle;
at least one electrical circuit carried by the aerial vehicle, wherein the at least one electrical circuit has an amperage boost regulator in parallel with the at least one propulsion device or a speed controller of the at least one propulsion device, wherein the amperage boost regulator in parallel with the at least one propulsion device or the speed controller of the at least one propulsion device provides regulated voltage to the at least one propulsion device or the speed controller;
a tether connected between the aerial vehicle and a power source positioned remote from the aerial vehicle, wherein electrical power is transmitted to the aerial vehicle and at least a portion of the plurality of LEDs through the tether;
an electrical isolator connected between the speed controller and a flight controller, wherein the speed controller is electrically isolated from the flight controller, wherein the flight controller is connected to a power distribution module, wherein the power distribution module is connected in parallel to the amperage boost regulator, wherein a control signal transmitted from the flight controller to the speed controller is throttled to compensate for a voltage variance across the speed controller; and
a signal throttle connected between the speed controller and the power distribution module or integrated within the speed controller.

2. The system of claim 1, wherein when the at least one propulsion device or the speed controller of the at least one propulsion device draws greater amperage, the amperage boost regulator draws less amperage thereby decreasing amperage variances across the tether, and wherein when the at least one propulsion device or the speed controller of the at least one propulsion device draws less amperage, the amperage boost regulator draws greater amperage thereby decreasing amperage variances across the tether.

3. The system of claim 1, wherein the amperage boost regulator comprises at least one diode.

4. The system of claim 1, wherein the at least one propulsion device further comprises at least one rotor.

5. The system of claim 1, further comprising an electrical isolator connected between the at least one propulsion device or the speed controller of the at least one propulsion device and a flight controller, wherein the at least one propulsion device or the speed controller of the at least one propulsion device is electrically isolated from the flight controller.

6. The system of claim 5, wherein the flight controller is connected to a power distribution module.

7. An aerial vehicle electrical power system comprising:
an aerial vehicle having a plurality of propulsion devices;
a plurality of light-emitting diodes (LEDs) carried by the aerial vehicle;
at least one electrical circuit carried by the aerial vehicle, wherein the at least one electrical circuit has a plurality of amperage boost regulators, each in parallel with one of a plurality of speed controllers of the plurality of propulsion devices, respectively, wherein the amperage boost regulators in parallel with the plurality of speed controllers provides regulated voltage to the plurality of speed controllers;
a tether connected between the aerial vehicle and a power source positioned remote from the aerial vehicle, wherein electrical power is transmitted to the aerial vehicle and at least a portion of the plurality of LEDs through the tether;
an electrical isolator connected between each of the speed controllers and a flight controller, wherein each of the speed controllers is electrically isolated from the flight controller, wherein the flight controller is connected to a power distribution module, wherein the power distribution module is connected in parallel to one of the plurality of amperage boost regulators, wherein a control signal transmitted from the flight controller to one or more of the speed controllers is throttled to compensate for a voltage variance across the one or more of the speed controllers; and
a signal throttle connected between each of the speed controllers and the power distribution module or integrated within each of the speed controllers.

8. The system of claim 7, wherein when the one or more of the speed controllers draws greater amperage, a corresponding amperage boost regulator draws less amperage thereby decreasing voltage variances to the one or more of the speed controller and decreasing amperage variances across the tether or in series circuit, and wherein when the one or more of the speed controllers draws less amperage, the corresponding amperage boost regulator draws greater amperage thereby decreasing voltage variances to the one or more of the speed controllers and decreasing amperage variances across the tether or in series circuit.

9. The system of claim 7, wherein each of the amperage boost regulators comprises at least one diode.

10. The system of claim 7, wherein the plurality of propulsion devices further comprises a plurality of rotors, respectively.

11. The system of claim 7, further comprising at least one device carried by the aerial vehicle, wherein the at least one device is connected in parallel to one of the plurality of amperage boost regulators.

12. A method of regulating power variances and providing regulated voltage in a tethered aerial vehicle, the method comprising:

providing an aerial vehicle having a plurality of propulsion devices, and having a plurality of light-emitting diodes (LEDs) mounted thereto;

connecting a tether between the aerial vehicle and a power source located remote from the aerial vehicle;

providing at least one electrical circuit carried by the aerial vehicle, wherein the at least one electrical circuit has a plurality of amperage boost regulators, each in parallel with one of a plurality of speed controllers of the plurality of propulsion devices, respectively, wherein the plurality of amperage boost regulators provide regulated voltage to the plurality of speed controllers of the plurality of propulsion devices;

transmitting a quantity of electrical power through the tether, wherein the quantity of electrical power is transmitted through the at least one electrical circuit carried by the aerial vehicle;

electrically isolating each of the speed controllers from a flight controller using an electrical isolator connected between each of the speed controllers and the flight controller;

connecting the flight controller to a power distribution module, wherein the power distribution module is connected in parallel to one of the plurality of amperage boost regulators;

throttling a transmitted control signal from the flight controller to one or more of the speed controllers to compensate for a voltage variance across the one or more of the speed controllers with a signal throttle, wherein the signal throttle is connected between each of the speed controllers and the power distribution module or integrated within each of the speed controllers.

13. The method of claim 12, wherein when the one of the speed controllers draws greater amperage, a corresponding amperage boost regulator draws less amperage thereby decreasing voltage variances to the one of the plurality of speed controllers and decreasing amperage variances across the tether or in series circuit, and wherein when one of the speed controllers draws less amperage, the corresponding amperage boost regulator draws greater amperage thereby decreasing voltage variances to the one of the plurality of speed controllers and decreasing amperage variances across the tether or in series circuit.

14. The method of claim 12, wherein the plurality of propulsion devices further comprises a plurality of rotors, respectively.

15. The method of claim 12, further comprising connecting at least one device carried by the aerial vehicle in parallel to one of the plurality of amperage boost regulators.

* * * * *